United States Patent [19]

Ahad

[11] Patent Number: 5,214,110
[45] Date of Patent: May 25, 1993

[54] BRANCHED AZIDO COPOLYMERS

[75] Inventor: Elie Ahad, Ste-Foy, Canada

[73] Assignee: Her Majesty the Queen in right of Canada, as represented by the Minister of National Defence of Her Majesty's Canadian Government, Ontario, Canada

[21] Appl. No.: 550,823

[22] Filed: Jul. 11, 1990

Related U.S. Application Data

[62] Continuation-in-part of Ser. No. 415,723, Oct. 2, 1989, abandoned.

[51] Int. Cl.$^5$ .................. C08G 68/32; C08L 71/362; C08L 71/63
[52] U.S. Cl. .................. 525/403; 525/409; 552/11
[58] Field of Search .................. 525/403, 410, 409; 552/11

[56] References Cited

U.S. PATENT DOCUMENTS

| | | | |
|---|---|---|---|
| H272 | 3/1986 | Gibert | 525/328.8 |
| 3,645,917 | 2/1972 | Vandenberg | 525/403 |
| 3,971,743 | 7/1976 | Breslow | 525/403 |
| 4,268,450 | 5/1981 | Frankel et al. | 525/410 |
| 4,379,894 | 4/1983 | Frankel et al. | 525/403 |
| 4,486,351 | 12/1984 | Earl | 525/403 |
| 4,781,861 | 11/1988 | Wilson et al. | 552/11 |
| 4,879,419 | 11/1989 | Johannessen | 525/403 |
| 4,882,395 | 11/1989 | Ahad | 525/403 |
| 4,891,438 | 2/1990 | Ahad | 552/11 |
| 4,937,361 | 6/1990 | Wagner et al. | 552/11 |
| 4,962,213 | 10/1990 | Frankel et al. | 552/11 |

Primary Examiner—James J. Seidleck
Assistant Examiner—W. R. H. Clark
Attorney, Agent, or Firm—Nixon & Vanderhye

[57] ABSTRACT

The invention disclosed relates to novel branched chain hydroxy-terminated aliphatic polyether copolymers containing glycidyl azide and an additional substituent selected from the group consisting of alkylene oxide, styrene azide oxide and glycidyl units, and a single step method for the manufacture thereof which involves reacting a solid rubbery material selected from epichlorohydrin/alkylene oxide copolymer (PEEC) and polyepichlorohydrin homopolymer (PECH) with various epoxide monomers. The novel polyether copolymers are useful as energetic binders in explosive and solid rocket propellant compositions.

29 Claims, No Drawings

BRANCHED AZIDO COPOLYMERS

This application is a continuation-in-part of Ser. No. 07/415,723, filed Oct. 2, 1989, and now abandoned.

BACKGROUND OF THE INVENTION

This invention relates to novel branched chain hydroxy-terminated aliphatic polyether copolymers (including terpolymers) containing glycidyl azide, alkylene oxide, styrene azide oxide and glycidyl units.

Hydroxy-terminated aliphatic polyethers having alkyl azide substituents are useful as energetic binders and plasticizers in solid propellants and composite explosives. One such polyether is glycidyl azide polymer (GAP). This polymeric azide is used as an energetic binder (at MW 2,000–10,000) and as a plasticizer (at MW of about 500) in composite explosives and solid rocket propellant systems to impart additional energy to the formulations, increase the performance and enhance the stability and the mechanical properties of the system.

Similarly, the subject copolymers could be used as energetic binders (MW>2000) and plasticizer (MW.500) in solid rocket and gun propellants as well as in plastic bonded explosives and pyrotechnics to enhance the performance, the stability and physico-chemical properties of the system.

DESCRIPTION OF THE PRIOR ART

Linear hydroxy-terminated aliphatic polyethers having alkyl azide substituents, e.g. GAP, and a process for making same are described in U.S. Pat. No. 4,266,450 of May 19, 1981, in the name of M. B. Frankel et al.

Branched chain hydroxy-terminated aliphatic polyethers containing alkyl azide substituents and a process for making same are described in applicant's co-pending U.S. application Ser. No. 260,113, now U.S. Pat. No. 4,882,395 filed Oct. 20, 1988.

SUMMARY OF THE INVENTION

According to the invention, novel branched chain hydroxy-terminated aliphatic copolymers containing glycidyl azide and an oxide group, of structural Formula I are provided,

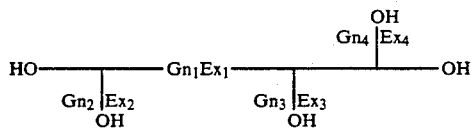

wherein
G is a glycidyl azide (GAP) unit

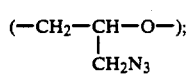

E is one or two of (—O—R), where R is alkyl, aryl or alcohol;
n1 and x1 are respectively the number of GAP and E units in segment 1;
n2 and x2 are respectively the number of GAP and E units in segment 2;
ns and xs are respectively the number of GAP and E units in segment s;
n is the total number of GAP units in the copolymer structure; and
x is the total number of E units in the copolymer structure; and
wherein $$n = (n1 + n2 + \ldots + n_s) = \sum_{i=1}^{s} n_i;$$

$$x = (x1 + x2 + \ldots x_s) = \sum_{i=1}^{s} x_i; \text{ and}$$

$$4 \leq n \leq 400 \quad 1 \leq x \leq 400;$$

and a molecular weight of 500 to 40,000; and wherein the amount of GAP in the copolymer is in the range of 60% to 95%/w, based on the weight of the copolymer.

According to the another aspect of the invention, a method for the manufacture of novel branched chain hydroxy-terminated aliphatic copolymers containing glycidyl azide and an oxide group, of structural Formula I

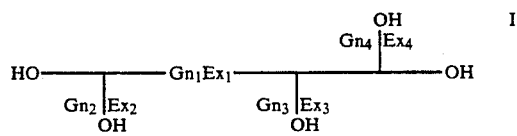

wherein
G is a glycidyl azide (GAP) unit

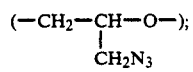

E is one or two of (—O—R), where R is alkyl, aryl or alcohol;
n1 and x1 are respectively the number of GAP and E units in segment 1;
n2 and x2 are respectively the number of GAP and E units in segment 2;
ns and xs are respectively the number of GAP and E units in segment s;
n is the total number of GAP units in the copolymer structure
x is the total number of E units in the copolymer structure; and
wherein $$n = (n1 + n2 + \ldots + n_s) = \sum_{i=1}^{s} n_i;$$

$$x = (x1 + x2 + \ldots x_s) = \sum_{i=1}^{s} x_i; \text{ and}$$

$$4 \leq n \leq 400 \quad 1 \leq x \leq 400;$$

and a molecular weight of 500 to 40,000 is provided, comprising the single step of reacting a solid rubbery material of molecular weight of 400,000 to 2,000,000 selected from epichlorohydrain/alkylene oxide copolymer (PEEC) and polyepichlorohydrin homopolymer (PECH), with an epoxide monomer; provided that when PECH is employed the epoxide monomer is not epichlorohydrin, and an ionic azide selected from the group consisting of sodium azide, lithium azide and potassium azide, in a suitable organic solvent at elevated temperature, while agitating.

When PECH is employed as starting material, the reaction mechanism is as described in our co-pending U.S. application Ser. No. 260,113. In the case of PEEC, the reaction mechanism is believed to involve (a) the degradation and azidation of the high MW rubbery PEEC are accomplished simultaneously by sodium azide and temperature;

(b) the polymerization and azidation of the epoxide monomer are carried out simultaneously by the ionic azide according to the same single-step process (as disclosed in our co-pending U.S. application Ser. No. 376,170, filed Jul. 6, 1989, a continuation-in-part of Ser. No. 059,524 of Jun. 8, 1987 now abandoned) to yield short growing chains of low MW (~500) GAP; and (c) these short growing chains of GAP thus formed are then grafted to the degraded rubbery matrix via chain transfer and give rise to termination and branching reactions.

Accordingly, this invention covers the reaction between a solid rubber (PEEC or PECH) and epoxide monomers such as epichlorohydrin (ECH), glycidol, styrene oxide (SO), etc., to yield branched azido copolymers and terpolymers as shown in Table 1.

TABLE 1

| Solid Rubber | Epoxide Monomer | Branched Azido Product |
|---|---|---|
| PEEC copolymer | ECH | glycidyl azide-alkylene oxide copolymer (e.g. 1) |
| " | glycidol | glycidyl azide-alkylene oxide-glycidyl terpolymer (e.g. 2) |
| " | styrene oxide | glycidyl azide-alkylene oxide-styrene azide oxide terpolymer (e.g. 3) |
| PECH homopolymer | glycidol | glycidyl azide-glycidyl copolymer (e.g. 4) |
| " | styrene oxide | glycidyl azide-styrene azide oxide copolymer (e.g. 5) |

Preferably, the weight ratio of ionic azide to the sum of (PECH+epoxide monomer) is about 1:1. In the case of PEEC, preferably, the weight ratio of ionic azide to the sum (PEEC+epoxide monomer) is about 0.8:1. Less azide is required in this case because the PEEC contains alkylene oxide. The preferred ionic azide is sodium azide. Thus, the amount of ionic azide employed is significantly less than required in the Frankel et al process described above. Moreover, no catalyst, e.g. HBF$_4$ or SnCl$_4$ are required in our process.

According to another aspect of the invention, the molecular weight of the branched chain hydroxy-terminated aliphatic polyether copolymers is controlled or predetermined. One way of accomplishing this is to adjust the weight ratio of solid rubbery material (PECH or PEEC): epoxide monomer (ECH, glycidol or styrene oxide) while maintaining the weight ratio of ionic azide: (rubber+epoxide) of about 0.8-1:1 in the reaction mixture, (i.e. for a given solvent and reaction temperature). For example, the molecular weight of GEC product is lowered by increasing the weight ration ECH:PEEC, (i.e. the molecular weight of the GEC product is inversely proportional to the weight ratio ECH:PEEC) while maintaining the weight ratio of NaN$_3$:(ECH+PEEC) of about 0.8:1 in the reaction mixture.

Further, the MW of the GEC product depends on the temperature, solvent and the ECH concentration. A decrease in the reaction temperature will cause a reduction in the degradation rate and thus a MW increase, i.e. by lowering the reaction temperature we simultaneously increase the MW and the reaction time for a given ECH concentration. For example, at lower temperature the reaction time is longer, i.e. at 100° C. the reaction time is about 15 h, while at 70° C., it is about 5 days. Accordingly, ECH concentration is used to control the MW of the GEC product and the % GAP in the GEC product. At a certain temperature and in a given solvent, the MW of GEC is lowered and the GAP content is increased by increasing the ratio (ECH/PEEC) in the reaction mixture.

The amount of GAP in GEC is in the range of 70% to 90%/w based on the weight of the copolymer.

More specifically, as shown in the following Table 2 and in the specific Example 1, this process enables the production of branched GEC with a hydroxyl functionality (f) of about 10.0 and with a relatively lower Glass Transition Temperature (Tg) as compared to GAP, i.e. branched GEC of MW 6,500 has a Tg of −70° C. compared to a Tg of −50° C. for linear GAP of MW 2,000 and a Tg of −60° C. for branched GAP of MW 9,000. The linear and branched GAP were respectively prepared according to the Frankel et al method described above and the degradation process of our co-pending U.S. application Ser. No. 376,170.

TABLE 2

| ECH (g) | PEEC (g) | NaN$_3$ (g) | MW of GEC | wt % GAP in GEC | Tg (°C.) | f |
|---|---|---|---|---|---|---|
| 1 | 10 | 8.8 | 21,000 | 71.3 | −60 | 10.1 |
| 3 | 10 | 10.4 | 10,700 | 74.6 | −65 | 8.5 |
| 6 | 10 | 12.8 | 6,500 | 78.4 | −70 | 9.2 |

A low glass transition temperature (Tg) is usually an indication of superior physio-chemical properties for the binder and as Tg decreased when the MW is reduced, this novel process enables then the production of branched GEC with relatively high MW but with still a much lower Tg compared to linear GAP.

Turning again to the novel branched copolymers according to out invention, when used as an energetic binder they exhibit certain superior physio-chemical properties relative to their linear counterparts.

Referring first to functionality, linear polymers as described in Frankel's process have an indicated functionality (f) of 2.

f is determined from the ratio (Mn/Me), wherein Mn and Me are respectively the number average MW and hydroxyl equivalent weight. When using the same relation, one actually observes functionality less than 2 for the linear GAP samples prepared according to Frankel's process.

Moreover, the viscosity of a branched polymer will be generally lower than the viscosity of a linear polymer with a similar MW. Consequently, the branched polymer will have a higher MW compared to the linear polymer with a similar viscosity. The following empirical relation was established between the MW of a branched GEC and linear GAP polymers for a given viscosity:

$$M_B = 0.12 M_L^{1.40}$$

$M_B$ is the MW of a branched GEC obtained from this process. $M_L$ is the MW of a linear GAP prepared according to Frankel's process and having the same viscosity as the branched GEC. Since the viscosity is an important factor in the processing of the binder formulation, this process enables then the production of higher MW branched GEC in the same viscosity range (4500-10,000 cp) normally used in the processing of linear GAP of lower MW as shown in Table 3. It will thus be appreciated that the branched polymers according to our invention enable the use of higher molecular weight binders in composite explosives and propellants, while maintaining the viscosity at sufficiently low levels so as not to hinder processing. Moreover, the direct relationship between viscosity and molecular weight of binder results in a lower useful upper limit molecular weight for linear polymers relative to their branched counterparts.

TABLE 3

| Viscosity at 25° C. | $M_L$ | $M_B$ |
|---|---|---|
| 4,500 | 2,000 | 5100 |
| 10,000 | 3,000 | 9000 |

The organic solvents employed in our process must dissolve the rubbery PEEC and also partically dissolve sodium azide in order to accomplish both the degradation and azidation reactions. Suitable organic solvents include polar organic solvents such as dimethyl formamide (DMF), dimethyl acetamide (DMA) and dimethyl sulfoxide (DMSO). Non-polar organic solvents may also be employed. For example, butyl acetate may be employed in conjunction with ethylene glycol to provide a mixed butyl acetate/ethylene glycol solvent. It is also contemplated that polyethyleneoxides of molecular weight in the range of 400 to 1,000 and dioxane may be employed as solvent.

The reaction temperature is typically in the range of 70°-100° C., with a temperature of about 100° C. being preferred.

The reaction time is about 15 hours.

Only DMF, DMA and DMSO are practically recommended in the temperature range from 70° to 100° C. As for the other solvents (polyethyleneoxide and butyl acetate/EG), it is preferable to carry out the degradation at 100° C. because a low temperature (such as 70° C. will require a much longer reaction time and will yield a product with relatively higher MW.

More preferably, an initial exothermic reaction is allowed to proceed at an initial temperature of about 70°-80° C., followed by heating to about 100° C. to complete the reaction. Specifically, the exothermic reaction arises from the opening of the epoxide ring of ECH which is caused by sodium azide and proceeds for about thirty minutes. The "30 minutes" period is approximate and depends on the duration of the gradual addition of sodium azide to the reaction mixture. The exothermic reaction is barely noticeable for low ECH concentrations but becomes more significant as the proportion of ECH is increased int he reaction mixture. The reaction is also less exothermic when accomplished under a nitrogen atmosphere. It is preferable to heat the reaction mixture at 70°-80° C. (approximately) during the addition of $NaN_3$ in order to control the exothermic reaction. Once the sodium azide addition is over and no sudden rise in temperature is observed, then heating to 1000° C. starts.

Preferably upon cooling, the solid salts (NaCl and unreacted $NaN_3$) are then filtered and most of the DMF is evaporated at 50° C. under vacuum. $MeCl_2$ (50 ml) is then added to the reaction mixture followed by three 100 ml water washes to remove the remaining DMF and salts.

Preferably, the washing step is followed by a purification step which involves drying over magnesium sulfate, and passing through a column containing silica gel. The solvent is then driven off by heating.

EXAMPLE 1

Branched glycidyl azide-alkylene oxide copolymer (GEC)

10 g of a commercial rubbery poly (epichlorohydrinethylene oxide) copolymer (PEEC) sample ($MW.5\times10^5$) is dissolved in DMF (50 g) for approximately two hours; agitation and heating at 100° C. are started. 1.0 g of epichlorohydrin (ECH) is then added to the mixture and the temperature is lowered to approximately 80° C. Sodium azide (8.8 g) is gradually added to the reaction mixture in order to control the initial exothermic reaction. Once the addition of sodium azide is over and no sudden rise in temperature is observed, then the reaction mixture is heated to about 100° C. and the agitation is carried out at this temperature for about 15 hours. Heating and agitation are stopped and the reaction mixture is allowed to cool. The solid salts (NaCl and unreacted $NaN_3$) are then filtered and most of the DMF is evaporated at 50° C. under vacuum. Methylene chloride (MC) (50 ml) is then added to the reaction mixture followed by three 100 ml water washes to remove the remaining DMF and salts. The MC solution is dried over magnesium sulfate and then is passed through a column containing 5 g of silica gel. The resultant solution is heated to 50° C. to remove MC and then dried under vacuum to yield 11.0 g of the GEC product: a viscous liquid with an amber colour. For GEC of MW=21,000 was characterized and had the following properties.

C(41.8); H(6.2); N(30.2); O(21.8) wt %.

Elemental analysis as well as NMR spectroscopy of the product confirmed that total azide conversion was achieved and that the copolymer had 71.3% GAP content.

The following Example 2 to 5 illustrate the extension of applicant's invention to other branched azide copolymers and terpolymers.

EXAMPLE 2

Branched glycidyl azide-ethylene oxide-glycidyl terpolymer (GEGT)

The method of preparation of this terpolymer is similar to Example 1 except that glycidol is used as the epoxide monomer instead of ECH. Glycidol concentration is used to control the MW of GEGT product and the % GAP in the terpolymer as shown in Table 4.

TABLE 4

| glycidol (g) | PEEC (g) | $NaN_3$ (g) | MW of GEGT | wt % GAP in GEGT | Tg (°C.) | f |
|---|---|---|---|---|---|---|
| 0.5 | 10 | 7.3 | 25,000 | 67 | −65 | 16 |
| 1.5 | 10 | 8.0 | 12,000 | 61 | −65 | 16 |

500-≦MW of GEGT≦40,000.

The max wt % GAP in GEGT is approximately 70%.

EXAMPLE 3

Branched glycidyl azide-ethylene oxide-styrene azide oxide terpolymer (GEST)

The method of preparation of this terpolymer is similar to Example 1 except that SO is used as the epoxide monomer instead of ECH. SO concentration is used to control the MW of GEST and the % GAP in the terpolymer product as shown in Table 5. An increase in the ratio (SO/PEEC) will cause a reduction of the MW and the GAP content in the terpolymer.

TABLE 5

| SO (g) | PEEC (g) | NaN$_3$ (g) | MW of GEST | wt % GAP in GEST | Tg (°C.) | f |
|---|---|---|---|---|---|---|
| 0.5 | 10 | 8.4 | 25,000 | 67 | −60 | 10 |
| 1.5 | 10 | 9.2 | 15,000 | 61 | −60 | 10 |

$500 \leq$ MW of GEST $\leq 40,000$.

The max wt % GAP in GEST is about 70%. The wt ratio NaN$_3$/(PEEC+SO) is 0.8.

EXAMPLE 4

Branched glycidyl-azide-glycidyl copolymer (GCG)

The method of preparation of this copolymer is similar to Example 1 except that rubbery polyepichlorohydrin (PECH) is used as the starting material instead of PEEC and Glycidol is used as the epoxide monomer instead of ECH.

Glycidol

Glycidyl Polymer

The polymerization of glycidol is carried out by NaN$_3$, and temperature (according to the single-step process) to yield short growing chains of low MW (~500) glycidal polymer that are then grafted to the degraded rubber. The grafting of glycidol introduces some additional terminal azide groups in the copolymer. Glycidol concentration is used to control the MW of the GGC product and the % GAP in the copolymer as shown in Table 6. An increase in the ratio (glycidol/PECH) will cause a reduction of the MW and the GAP content in the copolymer.

TABLE 6

| glycidol (g) | PECH (g) | NaN$_3$ (g) | MW of GGC | wt % GAP in GGC | Tg (°C.) | f |
|---|---|---|---|---|---|---|
| 1.0 | 10 | 9.9 | 17,000 | 91 | −60 | 16 |
| 1.5 | 10 | 10.3 | 8,000 | 87 | −60 | 16 |

$500 \leq$ MW of GGC $\leq 40,000$.

The wt % GAP in GGC is in the range of 60% to 95%.

EXAMPLE 5

Branched glycidyl azide-styrene azide oxide copolymer (GSC)

The method of preparation of this copolymer is similar to Example 1 except that rubbery polyepichlorohydrin (PECH) is used as the starting material instead of PEEC and styrene oxide (SO) is used as the epoxide monomer instead of ECH. The polymerization and azidation of SO are carried out simultaneously by NaN$_3$ and temperature (according to the single-step process) to yield short growing chains of low MW (~500) styrene azide oxide polymer that are then grafted to the degraded rubber.

Styrene Oxide

Styrene Azide Oxide Polymer

The grafting of SO introduces some additional azide terminal groups in the polymer. SO concentration is used to control the MW of the GSC product and the % GAP in the copolymer as shown in Table 7.

TABLE 7

| SO (g) | PECH (g) | NaN$_3$ (g) | MW of GSC | wt % GAP in GSC | Tg (°C.) | f |
|---|---|---|---|---|---|---|
| 1.0 | 10 | 11.0 | 14,000 | 90 | −55 | 10 |
| 2.5 | 10 | 12.5 | 7,000 | 80 | −55 | 10 |

An increase in the ratio (SO/PECH) will cause a reduction of the MW and the GAP content in the copolymer.

$500 \leq$ MW of GSC $\leq 40,000$.

The wt % GAP in GSC is in the range of 60% to 95%. The weight ratio NaN$_3$/(PECH)+SO) is equal to 1.0.

Less NaN$_3$ is required in the synthesis of GGC (e.g., Example 4) and GEGT (e.g., Example 2) because only some terminal azide groups are introduced on the glycidyl units (originating from the polymerization of glycidol) and also because NaN$_3$ does not react with ethylene oxide present in GEGT. A weight ratio of NaN$_3$/(PECH+glycidol) of about 0.9 is used in the case of GGC and a weight ratio of NaN$_3$/PEEC+glycidol) of about 0.7 is only needed for the synthesis of GEGT.

Also, in the synthesis of GGC and GEGT, the grafting of glycidyl units introduces additional primary alcohols (—CH$_2$OH groups) mainly on the side chains. This is an advantage in propellant formulations since primary alcohols react faster with isocyanates typically used compared to secondary alcohols which are mainly present as terminal groups. Obviously, branched copolymers and terpolymers containing glycidyl units will have relatively higher OH functionalities compared to branched GAP and GEC.

It will be appreciated by those skilled in the art that the degradation process when applied to other systems (rubber polymer/epoxide monomer) could yield different kinds of energetic homopolymers, copolymers and terpolymers with a branched structure and having a predetermined relatively low MW. Moreover, in the examples provided, the copolymers and terpolymers obtained included the same type of monomer and polymer and the same type of azide energetic groups. If the epoxide monomer or the rubber polymer had different energetic groups, the degradation process would then yield products containing a combination of two or more distinct energetic groups such as azide, nitrate, nitro, fluorine, etc.

I claim:

1. A process for the preparation of a branched chain hydroxy-terminated aliphatic polyether copolymer containing glycidyl azide and an oxide group, of structural Formula I,

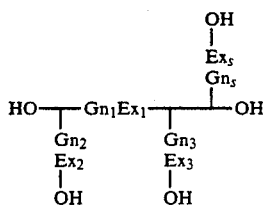

wherein
G is a glycidyl azide (GAP) unit

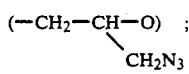

E is one or two of (—O—R), where R is alkyl, aryl or alcohol; $n_1$ and $x_1$ are respectively the number of GAP and E units in segment 1;

$n_2$ and $x_2$ are respectively the number of GAP and E units in segment 2;

$n_3$ and $x_3$ are respectively the number of GAP and E units in segment 3;

$n_s$ and $x_s$ are respectively the number of GAP and E units in segment s;

s is the total number of segments in the molecule;

n is the total number of GAP units in the copolymer structure; and x is the total number of E units in the copolymer structure; and wherein $$n = (n1 + n2 + \ldots + n_s) = \sum_{i=1}^{s} n_i;$$

$$x = (x1 + x2 + \ldots x_s) = \sum_{i=1}^{s} x_i; \text{ and}$$

$$4 \leq n \leq 400 \quad 1 \leq x \leq 400;$$

wherein the copolymer has a weight average molecular weight of 500 to 40,000, and wherein the amount of GAP in the copolymer is in the range of 60-95 wt %, based on the weight of the copolymer, said process comprising reacting in a single step a solid rubbery material selected from epichlorohydrin/alkylene oxide copolymer (PEEC) and polyepichlorohydrin homopolymer (PECH), of weight average molecular weight of 400,000 to 2,000,000 with an epoxide monomer, provided that when PECH is employed the epoxide monomer is not epichlorohydrin, and an ionic azide selected from the group consisting of sodium azide, lithium azide and potassium azide, in a suitable organic solvent at elevated temperature, while agitating.

2. A process as claimed in claim 1, wherein the organic solvent is selected from the group consisting of dimethyl formamide, dimethyl acetamide, dimethyl sulfoxide, butyl acetate/ethylene glycol mixture, dioxane and polyethyleneoxide of weight average molecular weight of 400 to 1,000.

3. A process as claimed in claim 2, wherein the organic solvent is dimethyl formamide.

4. A process as claimed in claim 3, wherein the ionic azide is sodium azide.

5. A process as claimed in claim 1, wherein the elevated temperature is about 70°-100° C.

6. A process as claimed in claim 4, wherein the solid rubbery material is dissolved in dimethyl formamide before reacting with the epoxide monomer and sodium azide.

7. A process as claimed in claim 6, wherein the sodium azide is added gradually at a reaction temperature of about 70°-80° C., and when the addition of sodium azide is complete and no sudden rise in temperature is observed, the reaction temperature is raised to about 100° C.

8. A process as claimed in claim 7, wherein the reaction time is about 15 hours.

9. A process as claimed in claim 8, wherein the reaction is carried out under a nitrogen atmosphere.

10. A process as claimed in claim 9, including the additional steps of purifying the copolymer, drying over magnesium sulfate and passing through a column containing silica gel.

11. A process as claimed in claim 4, wherein the weight ratio of sodium azide to the sum (solid rubbery material + epoxide) is about 0.8-1:1.

12. A process as claimed in claim 11, wherein the solid rubbery material is PEEC and the weight ratio of sodium azide to the sum (PEEC+epoxide) is about 0.8:1.

13. A process as claimed in claim 12, wherein the epoxide monomer is epichlorohydrin.

14. A process for the preparation of a branched chain hydroxy-terminated aliphatic polyether copolymer containing glycidyl azide and alkylene oxide units of structural Formula I,

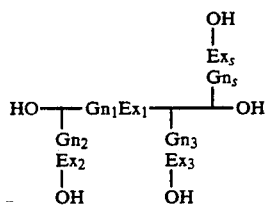

wherein
G is a glycidyl azide (GAP) unit

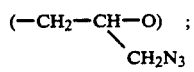

E is one or two of (—O—R), where R is alkyl, aryl or alcohol;

$n_1$ and $x_1$ are respectively the number of GAP and E units in segment 1;

$n_2$ and $x_2$ are respectively the number of GAP and E units in segment 2;

$n_3$ and $x_3$ are respectively the number of GAP and E units in segment 3;

$n_s$ and $x_s$ are respectively the number of GAP and E units in segment s;

s is the total number of segments in the molecule;

n is the total number of GAP units in the copolymer structure; and x is the total number of E units in the copolymer structure; and wherein $$n = (n1 + n2 + \ldots + n_s) = \sum_{i=1}^{s} n_i;$$

$$x = (x1 + x2 + \ldots x_s) = \sum_{i=1}^{s} x_i; \text{ and}$$

$$4 \leq n \leq 400 \qquad 1 \leq x \leq 400;$$

wherein the copolymer has a weight average molecular weight of 500 to 40,000, and wherein the amount of GAP in the copolymer is in the range of 60–95 wt % based on the weight of the copolymer, said process comprising reacting in a single step a solid rubbery material selected from epichlorohydrin/alkylene oxide copolymer (PEEC) and polyepichlorohydrin homopolymer (PECH), of weight average molecular weight of 400,000 to 2,000,000 with an epoxide monomer selected from the group consisting of epichlorohydrin, glycidol and styrene oxide, provided that when PECH is employed the epoxide monomer is not epichlorohydrin, and an ionic azide selected from the group consisting of sodium azide, lithium azide and potassium azide, in a suitable organic solvent at elevated temperature, while agitating, and wherein the molecular weight of the polyether is controlled by adjusting the weight ratio of epoxide: rubbery material, while maintaining a weight ratio of ionic azide: (epoxide+rubbery material) of about 0.8–1:1.

15. A process as claimed in claim 14, wherein the organic solvent is selected from the group consisting of dimethyl formamide, dimethyl acetamide, dimethyl sulfoxide, butyl acetate/ethylene glycol, dioxane and polyethyleneoxide of weight average molecular weight 400 to 1,000.

16. A process as claimed in claim 15, wherein the organic solvent is dimethyl formamide.

17. A process as claimed in claim 16, wherein the ionic azide is sodium azide.

18. A process as claimed in claim 14, wherein the elevated temperature is about 70°–100° C.

19. A process as claimed in claim 17, wherein the solid rubbery material is dissolved in dimethyl formamide before reacting with the epoxide monomer and sodium azide.

20. A process as claimed in claim 19, wherein the sodium azide is added gradually at a reaction temperature of about 70°–80° C., and when the addition of sodium azide is complete and no sudden rise in temperature is observed, the reaction temperature is raised to about 100° C.

21. A process as claimed in claim 20, wherein the reaction time is about 15 hours.

22. A process as claimed in claim 21, wherein the reaction is carried out under a nitrogen atmosphere.

23. A process as claimed in claim 22, including the additional steps of purifying the copolymer, drying over magnesium sulfate and passing through a column containing silica gel.

24. A process as claimed in claim 17, wherein the weight ratio of sodium azide to the sum (solid rubber-+epoxide) is about 0.8–1:1.

25. A process as claimed in claim 24, wherein the solid rubbery material is PEEC and the weight ratio of sodium azide to the sum (PEEC+epoxide) is about 0.8:1.

26. A process as claimed in claim 25, wherein the weight of PEEC is about 10 g and the weight of epichlorohydrin (ECH) is between 1 and 6 g and the weight of sodium azide is between 8.8 and 12.8 g.

27. A process as claimed in claim 26, wherein the weight of sodium azide is about 8.8 g and wherein the weight of ECH is about 1 g.

28. A process as claimed in claim 26, wherein the weight of sodium azide is about 10.4 g and wherein the weight of ECH is about 3 g.

29. A process as claimed in claim 26, wherein the weight of the sodium azide is about 12.6 g and wherein the weight of ECH is about 6 g.

* * * * *